United States Patent
Onuma et al.

(10) Patent No.: US 9,175,788 B2
(45) Date of Patent: Nov. 3, 2015

(54) HOLLOW POPPET VALVE

(71) Applicant: NITTAN VALVE CO., LTD., Hadano-shi, Kanagawa (JP)

(72) Inventors: Hiroki Onuma, Hadano (JP); Jin Hasegawa, Hadano (JP)

(73) Assignee: NITTAN VALVE CO., LTD., Hadano-shi (JP)

( * ) Notice: Subject to any disclaimer, the term of this patent is extended or adjusted under 35 U.S.C. 154(b) by 0 days.

(21) Appl. No.: 14/361,636

(22) PCT Filed: Oct. 2, 2012

(86) PCT No.: PCT/JP2012/075452
§ 371 (c)(1),
(2) Date: May 29, 2014

(87) PCT Pub. No.: WO2014/054113
PCT Pub. Date: Apr. 10, 2014

(65) Prior Publication Data
US 2014/0352803 A1 Dec. 4, 2014

(51) Int. Cl.
| F01L 3/14 | (2006.01) |
| F16K 49/00 | (2006.01) |
| F01L 3/16 | (2006.01) |
| F16K 1/12 | (2006.01) |
| B21K 1/22 | (2006.01) |
| B23P 15/00 | (2006.01) |

(52) U.S. Cl.
CPC .................. *F16K 49/007* (2013.01); *F01L 3/14* (2013.01); *F01L 3/16* (2013.01); *F16K 1/12* (2013.01); *B21K 1/22* (2013.01); *B23P 15/002* (2013.01); *Y10T 137/6579* (2015.04)

(58) Field of Classification Search
USPC ......... 137/334, 340; 123/41.34, 41.41, 188.3, 123/188.9
See application file for complete search history.

(56) References Cited

U.S. PATENT DOCUMENTS

| 1,809,201 | A | * | 6/1931 | Higgins | ...................... 123/41.41 |
| 2,544,605 | A | * | 3/1951 | Mallory | ...................... 123/41.41 |

(Continued)

FOREIGN PATENT DOCUMENTS

| DE | 2727006 A1 | * | 12/1978 |
| FR | 490855 A | * | 5/1919 |
| JP | 02-124204 U | | 10/1990 |
| JP | 03-52309 U | | 5/1991 |

(Continued)

OTHER PUBLICATIONS

International Search Report dated Nov. 13, 2012, issued in corresponding application No. PCT/JP2012/075452.

*Primary Examiner* — John K Fristoe, Jr.
*Assistant Examiner* — Jonathan Waddy
(74) *Attorney, Agent, or Firm* — Westerman, Hattori, Daniels & Adrian, LLP

(57) ABSTRACT

To provide a hollow poppet valve having an improved heat reduction effect. In a hollow poppet valve (10) having a valve head (14) and a stem (12) integral with the valve head (14), the hollow poppet valve (10) is formed with an internal cavity S that extends in the valve head (14) and the stem (12). The internal cavity S is charged with a coolant (19) and an inert gas. The internal cavity S has a generally disk-shape internal cavity S1 and an internal stem cavity S2 formed in the stem (12) and connected to the internal valve head cavity S1 at a right angle. During a reciprocal motion of the valve (10), a vertical convective flow of coolant (19) along the axis L of the valve (10) is established at least in the internal valve head cavity S1, thereby enhancing its heat reduction effect.

7 Claims, 9 Drawing Sheets

(56) References Cited

U.S. PATENT DOCUMENTS 3,313,277 A * 4/1967 Adolfsson et al. ......... 123/41.41
5,413,073 A * 5/1995 Larson et al. .............. 123/188.3
5,769,037 A * 6/1998 Ohtsubo et al. ........... 123/41.34

FOREIGN PATENT DOCUMENTS

| JP | 04-76907 U | 7/1992 |
| JP | 2011-179328 A | 9/2011 |
| WO | 2010/041337 A1 | 4/2010 |

* cited by examiner (a)

(b)

HOLLOW POPPET VALVE

TECHNICAL FIELD OF THE INVENTION

This invention relates to a hollow poppet valve having an internal cavity formed in a valve head and in a stem of the valve, the internal cavity charged with a coolant.

BACKGROUND ART

Patent Documents 1 and 2 listed below disclose hollow poppet valves formed with an internal cavity in the valve head and the stem of the valve, with the space charged with a coolant (such as metallic sodium, which has a melting point of about 98° C.) having a higher heat conductivity than the valve material, together with an inner gas.

The internal cavity extends from inside the valve head into the stem adapted to contain a large amount of coolant for enhanced heat transfer property of the valve. (The property enhanced by the coolant will be hereinafter referred to as heat reduction effect.)

An engine is heated during an operation, and, if the temperature of the combustion chamber of the engine is excessively, knocking may take place, which lowers the fuel efficiency and hence the power of the engine. In order to lower the temperature of the combustion chamber, there has been proposed use of a coolant charged in an internal cavity formed in a valve together with an inner gas so as to positively enhance the heat transfer effect of the valve.

PRIOR ART DOCUMENTS

Patent Document

Patent Document 1: WO20/041337
Patent Document 2: JPA Laid Open 2011-179328

SUMMARY OF THE INVENTION

Objects to be Solved by the Invention

Conventional coolant-charged hollow poppet valves have an internal cavity formed in its generally disk-shape valve head (the cavity hereinafter referred to as internal valve head cavity), and a linear internal cavity formed in its stem (the cavity hereinafter referred to as internal stem cavity), and a transient region smoothly connecting the two internal cavities (the region hereinafter referred to as interconnecting region) so as to allow smooth flow of liquefied coolant and a charged gas from one cavity to another, thereby enhancing the heat conduction effect.

The inventors of the present invention conducted some experiments to verify the heat conduction effect on three different types of valves as shown in FIG. 9: solid valve A; valve B having an internal stem cavity charged with a liquid coolant (metallic sodium); and valve C having an internal valve head cavity in communication with an internal stem cavity charged with the liquid coolant. The results of the experiments are shown in FIGS. 4 and 5. The hollow valve B and C are charged with the argon gas together with metallic sodium. The hollow valve B is formed by first charging a stem with the coolants and then by friction welding it with a valve head (at position b1). The hollow poppet valve C is formed by first charging the coolants in its internal valve head cavity and then welding a cap to the open end of the cavity.

In the experiments, each of the valves A, B, and C is mounted on an automobile engine and subjected to a predetermined warm-up operation, and a subsequent full throttle operation under a predetermined high engine load for predetermined hours. Surface temperatures of the valves were measured in temperature-hardness tests.

FIG. 4 shows curves A, B, and C representing the distributions of the surface temperatures T (more correctly, the temperature at the depth of 0.5 mm from the surface) of the respective valve A, B, and C in the axial direction. It is seen in the figure that the each of the surface temperatures gradually rises in the direction away from their valve seat face and reaches a maximum temperature Tmax, and then gradually falls. The curve (A) can be roughly represented by a quadratic curve having a maximal point Tmax at a fillet portion of the valve near the stem. The temperature distribution of valve B can be also represented roughly by a quadratic curve, with the point of the highest temperature (Tmax) shifted a little away from the fillet towards the valve head, and the curve B has a generally lower height (temperature) than curve A. The curve C has its maximum temperature point still closer to the valve head, and has a generally lower height than curve B.

More particularly, there is not an appreciable difference in temperature distribution between the valve B and valve C outside the valve seat face, but there is a noticeable difference in temperature distribution between the valve B and valve C inside the valve seat face. Further, in the valve B, the maximal temperature point (axial position exhibiting Tmax) is in the fillet near the stem, while in the valve C the point is substantially at the center of the fillet.

Referring to FIG. 5, there are shown radial surface temperature distributions on the bottom faces (or flat faces) of the valves A, B, and C. It is seen that in any of the valves A, B, and C the temperature T becomes highest at the center of the bottom end and decreases with the distance from the axis of the valve head. It is particularly noted that in the valves A and B the temperature reaches Tmax at the center of the bottom end of the valve head, and that in the valve C a much lower highest temperature spreads over a certain range of the bottom face in comparison with the valves A and B.

Thus, it can be said that the hollow poppet valve B charged with a coolant in its internal cavity has better heat reduction effect (heat transport property) than the solid poppet valve A, and the hollow poppet valve C has better heat reduction effect than the valve B since the former is charged with more coolant than the latter.

To confirm that the hollow poppet valve C has the best heat reduction effect (heat transport property), a computer analysis was conducted to simulate the behaviors of the coolant in the hollow poppet valve C during an opening/closing operation of the valve (that causes the valve to be moved up and down in the axial direction). The simulation reveals that the coolant smoothly moves between the internal valve head cavity and small the internal stem cavity.

It is estimated from this simulation that such better heat reduction effect (heat transport property) of the valve C is brought by smooth movement of the liquefied coolant from one cavity to the other cavity across a smooth interconnecting region between them.

The inventors further sought for a way to enhance this heat reduction effect (heat transport property).

They have noticed that, although the coolant smoothly moves across the smooth interconnecting region between the internal valve head cavity and internal stem cavity, the liquefied coolant in the upper, middle, and lower regions of valve head cavity moves in the axial direction without being stirred or mixed with each other.

The fact that the coolant is not stirred implies that the heat stored in the coolant closer to a heat source is not transferred to the coolant in the middle and upper regions of valve head cavity, not contributing to the heat reduction effect (heat transport property).

The inventors realized that the coolant in the hollow poppet valve C can smoothly move across the interconnecting region during a reciprocal movement of the valve, thereby enhancing its heat reduction effect to a certain degree as shown in FIGS. 4 and 5, and that nevertheless the maximum possible heat reduction effect (heat transport property) is not achieved, since the smooth interconnecting region of the valve allows smooth movement of the coolant and prevents the coolant from being stirred in the movement.

The inventors has come to a conclusion that the heat reduction effect (heat transport property) will be greatly enhanced if convection of the coolant in the upper, middle, and lower regions of the internal valve head cavity is established to stir the coolant.

More particularly, the inventors conducted computer simulations of flows of coolant charged in an internal valve head cavity and an internal stem cavity connected, at a right angle at one open end thereof, with the internal valve head cavity, wherein a planar region round the open end of the internal stem cavity forms an eave-shape annular step between the two cavities. It is confirmed in the computer simulations that the coolant in the internal valve head cavity circulates therein by convection, exhibiting a flow along the axis of the valve in association with the valve movements during an opening and closing operation of the valve.

In high load tests (full throttle operation) of hollow poppet valves, a test valve having the same configuration as the one used in the computer simulations above was tested in the same manner as for the valves A, B, and C. The tests reveal that the test valve has a better heat reduction effect (heat transport property) than the conventional hollow poppet valve C.

Thus, based on the above-described empirical confirmation of the hollow poppet valve, it is possible to provide a hollow poppet valve having an improved heat reduction capability as compared with conventional hollow poppet valves, by providing a poppet valve with an internal valve head cavity and an internal stem cavity connected thereto at a right angle via a peripheral planar region formed round the open end of the internal stem cavity, by virtue of convective flows of the coolant established in the internal valve head cavity.

It is, therefore, an object of the present invention to provide a hollow poppet valve having an improved heat reduction power, established on the basis of the foregoing computer simulations and load tests to improve heat reduction capabilities of prior art hollow poppet valves.

Means for Achieving the Object

To achieve the object above, there is provided in accordance with the invention a hollow poppet valve having a stem integral at one end thereof with a valve head, the valve having an internal cavity that extends from within the valve head into the stem and charged with a coolant together with an inert gas, in a first example, the poppet valve characterized in that:

the valve head is provided inside thereof with circular truncated-cone shape internal valve head cavity having a conic surface in parallel with the tapered outer periphery of the valve head;

the stem is provided inside thereof with a linear internal stem cavity connected perpendicularly with an upper end surface of the circular truncated-cone; and the ceiling is a peripheral region having a planar surface round one open end of the linear stem cavity, the planar surface being perpendicular to the axis of valve, whereby a vertical convective flow of coolant along the axis of the valve is established at least in the internal valve head cavity during a reciprocal motion of the valve.

(Function) When the valve is in a downward movement to open an exhaust port, the coolant is subjected to an upward inertial force as shown in FIG. 2(a). Since the (upward) inertial force then acting on the coolant is larger in the central region of the internal valve head cavity than in the surrounding region, the central coolant is urged to move into the internal stem cavity via the interconnecting region between the internal valve head cavity and the internal stem cavity. However, since the eave-shape annular step is formed in the interconnecting region, that is, the upper end surface of the internal valve head cavity (or the peripheral region round the open end of the internal stem cavity) is a planar face perpendicularly to the axis of the poppet valve, the coolant cannot smoothly flow into the internal stem cavity as in a conventional C-type hollow poppet valve.

In more detail, the upward inertial force creates radially inward flows of coolant F1 and F2 that flow along the annular step (or the ceiling of the internal valve head cavity) towards the center of the interconnecting region as shown in FIG. 3(a). In the interconnecting region, two radially inward flows F2 collide with each other, and splits into a downward flow F3 towards the bottom of the internal valve head cavity and an upward flow F4 towards the internal stem cavity region S2. In the interconnecting region, the flow F3 directed to the bottom of the internal valve head cavity is turned into radially inward flows F1 and F2, which flows towards the ceiling, along the ceiling and past the ceiling. On the other hand, the upward flow F4 directed into the upper internal stem cavity grows into a turbulent flow F5 in the interconnecting region, as shown in FIG. 3(a).

In this way the coolant circulates in the internal valve head cavity by convection, resulting in a circulatory flow indicated by a sequence of arrows F1, F2, and F3 and F1, while creating a turbulent flow in the internal stem cavity.

When the valve is in an upward movement to close the exhaust gas port, the coolant is subjected to a downward inertial force as shown in FIG. 2(b). Since the downward inertial force acting on the coolant in the central region of the internal valve head cavity is larger than that acting on the coolant in the peripheral region, a radially outward flow F6 of coolant is created along the bottom of the internal valve head cavity as shown in FIG. 3(b). At the same time, a downward turbulent flow F7 is created in the internal stem cavity, which flows into the internal valve head cavity across the interconnecting region. This flow F6 flowing along the bottom of the internal valve head cavity is eventually turned into a generally upward flow F8 to the ceiling of the internal valve head cavity S1 and merges into the central flows F6 and F7.

In other words, a convective flow of coolant as indicated by a sequence of arrows F6, F8, and F6 is created in the internal valve head cavity and so is a turbulent flow in the internal stem cavity as indicated by arrow F7.

In this way, in association with the upward and downward movements of the valve, a convective coolant flow that involves turbulence is created in the entire internal cavity as shown in FIG. 3(a)-(c), actively mixing upper, middle, and lower coolant in the internal cavity and significantly improving the heat reduction effect (heat transport property) of the valve.

(Function) Firstly, since the internal valve head cavity is configured to have an inner periphery tapered similar in shape to that of the valve head, a large volume of coolant can be stored therein.

Secondly, as the ceiling and the tapered peripheral surface of the internal valve head cavity make an obtuse angle between them, radially inward flows of the coolant created during an opening/closing operation of the valve is smoothly directed to the interconnecting region past the ceiling as shown in FIG. 3(a) by arrows F1 and F2 and in FIG. 3(b) by arrow F8, which flows in turn activates the convection of the coolant in the internal valve head cavity.

This type of hollow poppet valve is manufactured in a sequence of steps including:

a step of forming a recess that corresponds to an internal valve head cavity by forging using a die;

a step of drilling a central bore that corresponds to an internal stem cavity in the bottom of the recess in association with an internal stem cavity;

a step of charging an amount of coolant in the recess (internal valve head cavity) of the valve head; and a step of welding a cap onto the open end of the recess to enclose the coolant in an inert gas atmosphere.

Since the internal valve head cavity thus formed has a shape of a circular truncated-cone having a flat ceiling, it has the following advantages.

Firstly, since the pressing face of a metallic die used in the forging is flat, it is easier to prepare a die having a flat pressing face than a die having a curved face or a tapered face.

Secondly, since the bottom of the recess is flat, a process of flattening the bottom of the recess is not needed.

Thirdly, since the flat bottom face of the recess is flat and perpendicular to the mandrill, a drill bit can be accurately operated in alignment with the axis of the stem when drilling a hole in the bottom.

In the hollow poppet valve according to the second example, the internal valve head cavity may be formed in the shape of a generally circular truncated-cone with its circular ceiling offset from the position of the upper end surface of the circular truncated-cone towards the stem by a predetermined distance, in a third example.

(Function) In the valve configuration of the second example, since the internal valve head cavity has a shape of circular truncated-cone having a circular flat ceiling, it suffices to provide a die having a flat pressing face for forging the valve head. Hence, it is much easier to prepare such die than a conventional die for forging a curved or tapered pressing face.

However, it is difficult to accurately form such circular ceiling (upper end surface of the circular truncated-cone) only by forging. Besides, the pressing face of the die for forming the flat ceiling can be quickly worn out.

In contrast, in the third example, the internal valve head cavity may be provided with a ceiling offset from the position of the upper end surface of the circular truncated-cone towards the stem by a predetermined distance. This can be done by, for example, machining an initially forged semi-spherical bottom surface of the recess into a circular flat surface perpendicular to the axis of the valve. In this case, the die may have a less wearing rounded pressing face to form a curved ceiling of the internal valve head cavity, after which a ceiling may be easily and accurately formed by machining while relaxing precision requirement of the die.

Results of the Invention

According to the invention, the heat reduction effect (or heat transport property) of a hollow poppet valve is significantly improved by virtue of the convection of a coolant that circulates in an internal valve head cavity and an internal stem cavity of the valve, which in turn improves the performance of the engine.

It is noted that, a large amount of coolant can be stored in the internal valve head cavity, which helps active vertical convection of the coolant along the vertical axis of the internal valve head cavity, thereby enhancing the heat reduction effect (or heat transport property), and hence the performance, of the valve.

In addition, since the ceiling of the internal valve head cavity is flat, it is not only easy to provide a die for forming the ceiling of the internal valve head cavity, but also easy to drill an internal stem cavity that opens at the center of the ceiling. Thus, the manufacturing cost of a poppet valve can be reduced.

The method of the third example ensures a certain degree of machining precision in forming an internal valve head cavity, thereby enabling provision of poppet valves having homogenized heat reduction capability.

BRIEF DESCRIPTION OF THE DRAWINGS

FIG. 2(a) is a cross sectional view of the valve in downward motion (to open the valve), showing an inertial force acting on the coolant, and FIG. 2(b) the valve in upward motion (to close the valve), showing an inertial force acting on the coolant. FIG. 3(a) shows the valve in downward motion to open the port, and FIG. 3(b) the valve in upward motion to close the port. FIG. 6(a) illustrates a step of forming a valve head at one end of a stem by upset forging (or by extrusion forging), FIG. 6(b) a step of boring an internal stem cavity in the stem through the bottom (ceiling) of the internal valve head cavity of the valve head, FIG. 6(c) a step of injecting an amount of coolant into the internal cavity, and FIG. 6(d) a step of welding a cap onto the opening of the internal valve head cavity in an inert gas atmosphere. FIG. 8(a) shows a step of forging to form a valve head at one end of a stem, and FIG. 8(b) a step of machining the bottom end of a recessed valve head and of boring a borehole in the stem to form an internal stem cavity.

BEST MODE FOR CARRYING OUT THE INVENTION

Figure 1:
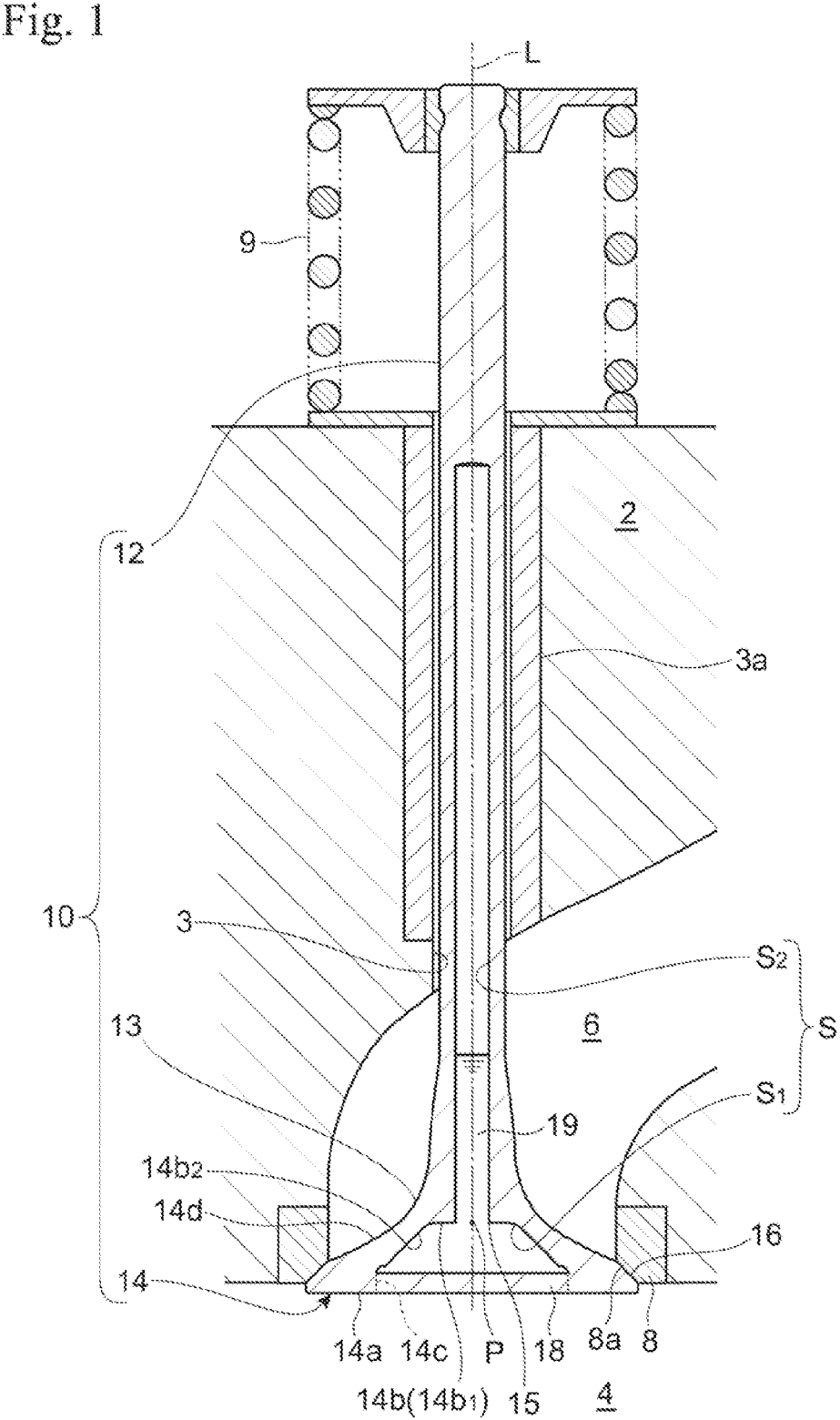
FIG. 1 is a longitudinal cross section of a hollow poppet valve in accordance with a first embodiment of the invention.

The present invention will now be described in detail by way of example with reference to two embodiments.

Referring to FIGS. 1 through 5, there is shown a hollow poppet valve for an internal combustion engine, in accordance with a first embodiment of the invention.

In these figures, reference numeral 10 indicates a hollow poppet valve made of a heat resisting metal. The valve 10 has a valve head 14 and a straight stem 12 integrated with the valve head via a curved fillet 13 between the valve head 14 and the stem 12 and having a radially increasing diameter. Provided in the periphery of the valve head 14 is a tapered valve seat face 16.

In more detail, the hollow poppet valve 10 has a shell 11 (FIG. 6) which comprises a valve head 14a integrally formed at one end of the stem 12. The valve head 14a has a recess 14b in the shape of a circular truncated-cone. A disk shape cap 18 is welded to an open end 14c of the recess 14b so as to form an internal cavity S that extends from within the valve head into the stem. The internal cavity S is charged substantially half (about ½-⅗) of it with a coolant 19, such as metallic sodium, together with an inert gas such as argon.

As shown in FIG. 1, an exhaust gas port 6 is provided in a cylinder head 2 of the engine. The port 6 extends from the combustion chamber 4 of the engine. Provided in a peripheral region round the port 6 of the combustion chamber 4 is an annular valve seat insert 8 having a tapered face 8a, on which the valve seat face 16 of the valve 10 can be seated. Provided on the inner periphery of a valve insertion hole 3 formed in the cylinder head 2 is a valve guide 3a for receiving the stem 12 in slidable contact therewith. The hollow poppet valve 10 is urged by a valve spring 9 to close the valve.

Figure 6:
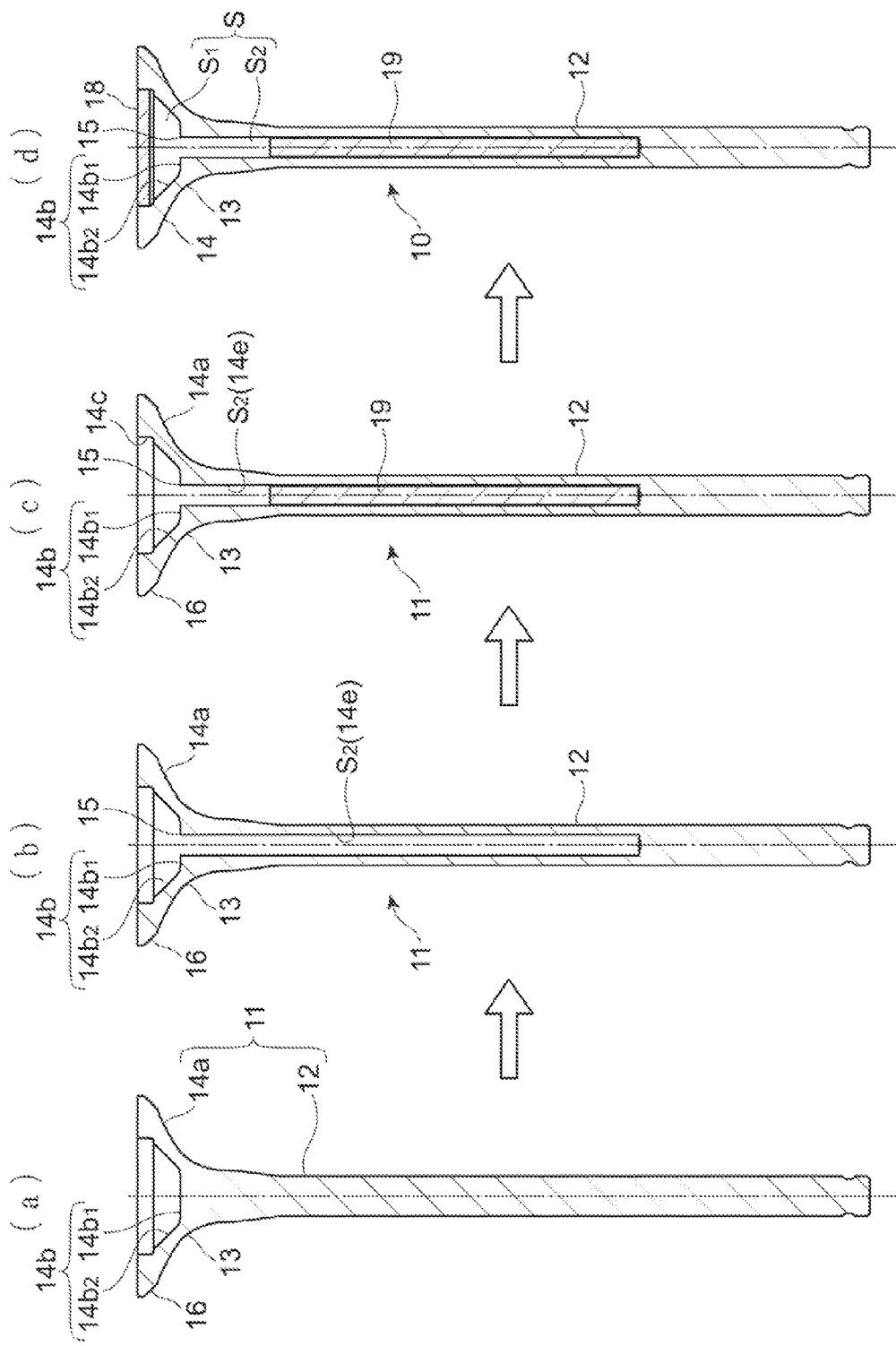
FIG. 6 shows steps of manufacturing a hollow poppet valve. More particularly.

The internal cavity S consists of an internal valve head cavity Si and a linear internal stem cavity S2 formed in the stem 12 in such a way that the internal stem cavity S2 intersects (communicates with) the internal valve head cavity Si at a right angle. Round the periphery of an open end of the internal stem cavity S2 is a circular flat ceiling 14b1 (or the planar bottom face of the circular truncated-cone shape recess 14b) perpendicular to the axis L of the valve 10 (FIG. 6).

There is provided in the internal cavity a region P interconnecting the internal valve head cavity S1 and the internal stem cavity S2. This interconnecting region P has a horizontal eave-shape annular step 15 (as seen from the internal valve head cavity S1) in place of a conventional smooth interconnecting region. The flat face 14b1 of the annular step 15 facing the internal valve head cavity Si is perpendicular to the axis L of the hollow poppet valve 10. In other words, the eave-shape annular step 15 is defined by the peripheral area 14b1 round the open end of the internal stem cavity S2 (or the bottom of the circular truncated-cone-shape recess inside the valve head shell) and the inner periphery of the internal stem cavity S2.

As a consequence, a circulatory flow (convection) of coolant 19 is created in the internal valve head cavity S1 and a turbulent flow in the internal stem cavity S2 during an opening/closing operation of the hollow poppet valve 10, as indicated by arrows shown in FIG. 3(a)-(b) and described in more detail later. Thus, because of this convection and turbulence of coolant in the internal cavity S, upper, middle, and lower portions of the coolant are actively mixed, thereby greatly enhancing the heat reduction effect (or heat transport property) of the hollow poppet valve 10.

Figure 2:
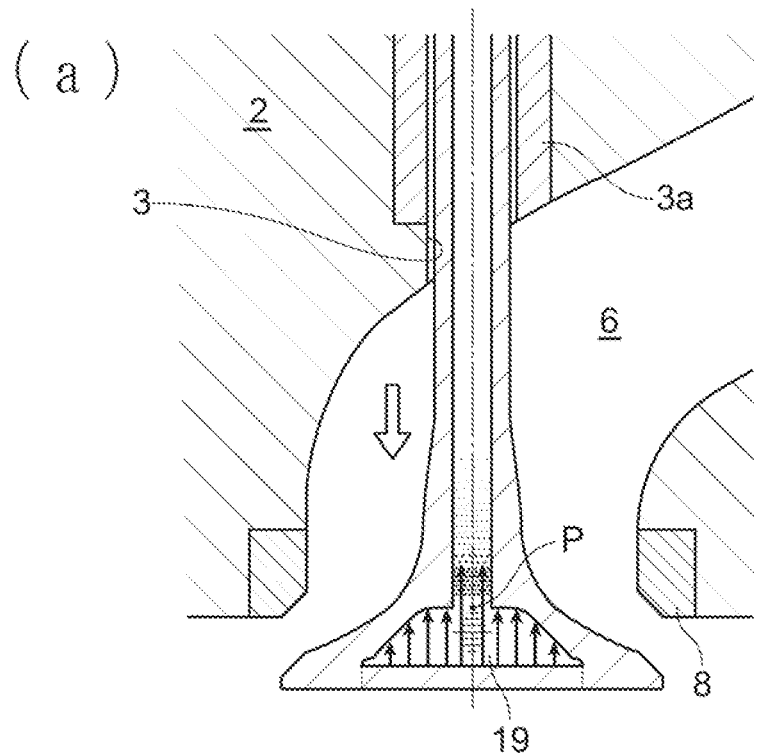
FIG. 2 is a diagram illustrating inertial forces that act on the coolant in the internal cavities of the poppet valve during reciprocal movements thereof. More particularly.
Figure 2:
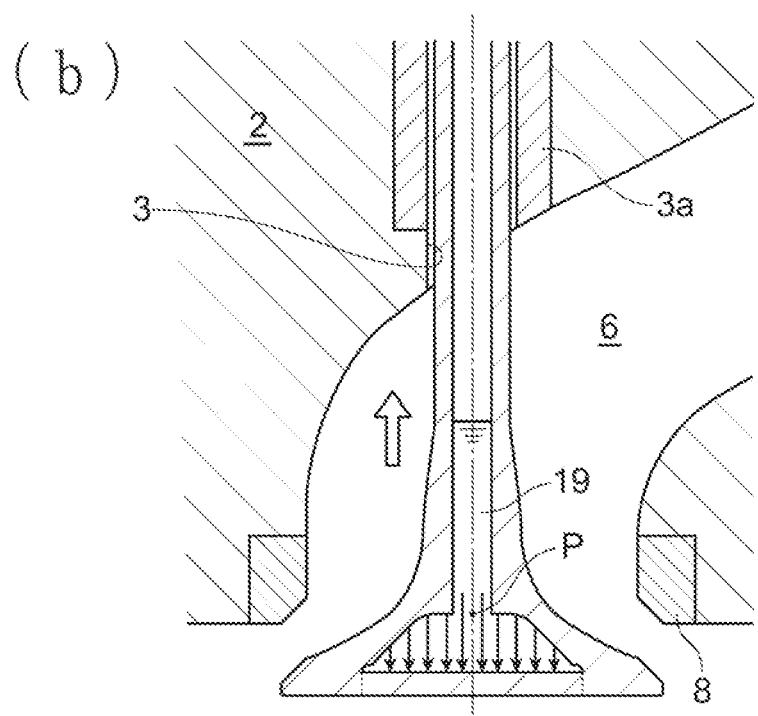
Figure 3:
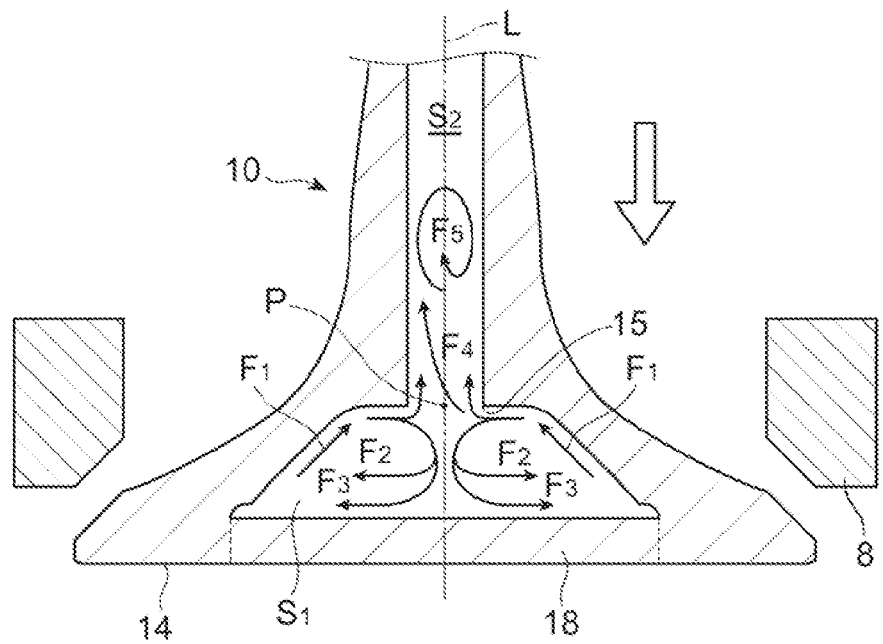
FIG. 3 shows in enlarged view the movement of the coolant during a reciprocal movement of the hollow poppet valve. More particularly.
Figure 3:
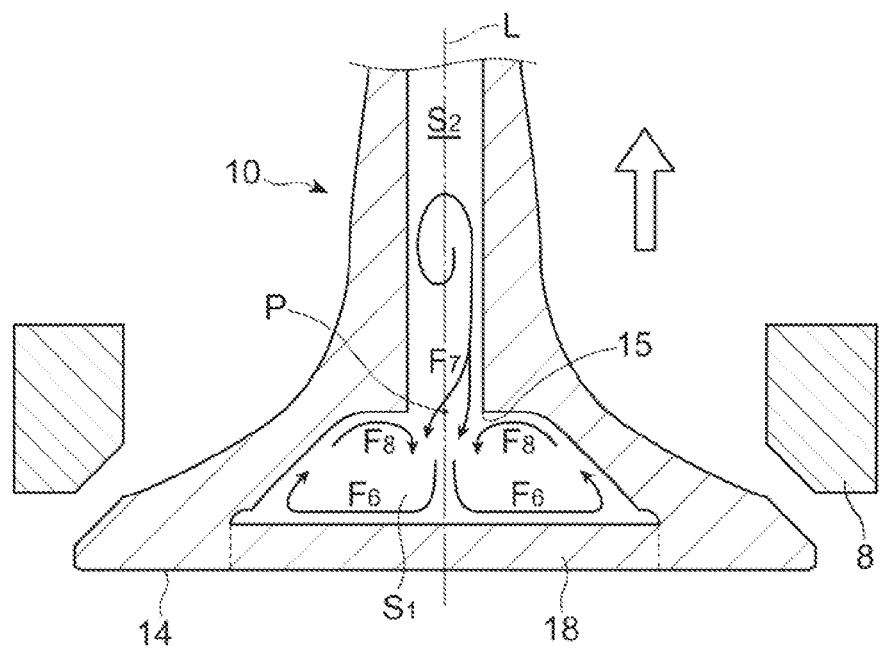

Next, behaviors of the coolant during an opening/closing operation of the hollow poppet valve 10 will now be described in detail with reference to FIGS. 2 and 3.

As the closed hollow poppet valve 10 is moved downward to open the port as shown in FIG. 2(a)), the coolant 19 in the internal cavity S is acted upon by an upward inertial force. Since the upward force acting on the central coolant 19 in the central region of the internal valve head cavity S1 is greater than that acting on the peripheral coolant in the internal valve head cavity S1, the coolant 19 in the internal valve head cavity S1 tends to flow into the internal stem cavity S2 across the interconnecting region P. However, the coolant cannot move into the internal stem cavity S2 as smoothly as in a conventional valve because of the annular step 15 formed at the interconnecting region P.

Consequently, in the internal valve head cavity S1, radially inward flows F1 and F2 of the coolant 19 are created along the annular step 15 by the upward inertial force, which will flow along the ceiling 14b1 of the internal valve head cavity S1 and rush to the center of the interconnecting region P, as shown in FIG. 3(a). The two flows F2 heading towards the interconnecting region P along the annular step 15 collide with each other, and change into a downward flow F3 towards the bottom of the internal valve head cavity S1 and an upward flow F4 into the internal stem cavity S2.

The flow F3 heading to the bottom of the internal valve head cavity S1 is re-directed in the interconnecting region P to a radially outward region of the cavity S1, and then re-directed towards the ceiling of the internal valve head cavity S1, eventually merging together into the flows F1 and F2 towards the center of the interconnecting region P. On the other hand, the upward flows F4 and F5 are changed in the interconnecting region P into turbulent flows in the internal stem cavity S2, as shown in FIG. 3(a).

In this way, convention of the coolant 19 that passes along the axis L is created in the internal valve head cavity S1 as indicated by arrows F1, F2, F3, and F4, as well as turbulent flows F4 and F5 in the internal stem cavity S2.

On the other hand, when the valve 10 moved upward to close the port, the coolant 19 in the internal cavities S is subjected to a downward inertial force as shown in FIG. 2(b). In this case, since the downward inertial force acting on coolant 19 in a central region of internal valve head cavity Si is larger than that acting on the coolant in a peripheral region, the coolant 19 in the central region descends to the center of the bottom of the cavity, which turns out in part to be radially outward flows F6 along the bottom as shown in FIG. 3(b). At the same time, a downward turbulent flow F7 is created in the internal stem cavity S2. The flows F6 along the bottom of the cavity S1 are eventually re-directed towards the ceiling of the cavity S1 and, after flowing along the ceiling (F8), merge into the downward flows F6 and F7 in the central interconnecting region P.

In other words, convective flows of the coolant 19 as indicated by arrows F6, F8, and F6 are created in the internal valve head cavity S1, while a turbulent flow F7 is created in the internal stem cavity S2.

It should be understood that the internal valve head cavity S1 of the present embodiment has a shape of a circular truncated-cone, with its inner conic surface 14b2 being tapered in substantially parallel with the external tapered periphery 14d between the valve seat face 16 and the fillet 13 of the valve head 14, as seen in FIG. 1. Thus, firstly, a large amount of coolant 19 can be advantageously stored in the internal valve head cavity S1.

Secondly, since the circular ceiling (or the upper end surface) 14b1 and the tapered face (conic surface) 14b2 of the internal valve head cavity Si make an obtuse angle, smooth and active circulatory convective flows of the coolant 19 are established along the ceiling, past the tapered face, and towards the interconnecting region P (involving radially inward flows F1 and F2, and F8) during an opening/closing operation of the valve, as shown in FIGS. 3(a)-(b).

In this way, the heat reduction effect (heat transport property) of the valve 10 is dramatically improved by the active laminar and turbulent flows of coolant in the entire internal cavity S by the opening/closing movements of the valve 10, as shown in FIGS. 3(a) and (b).

Figure 4:
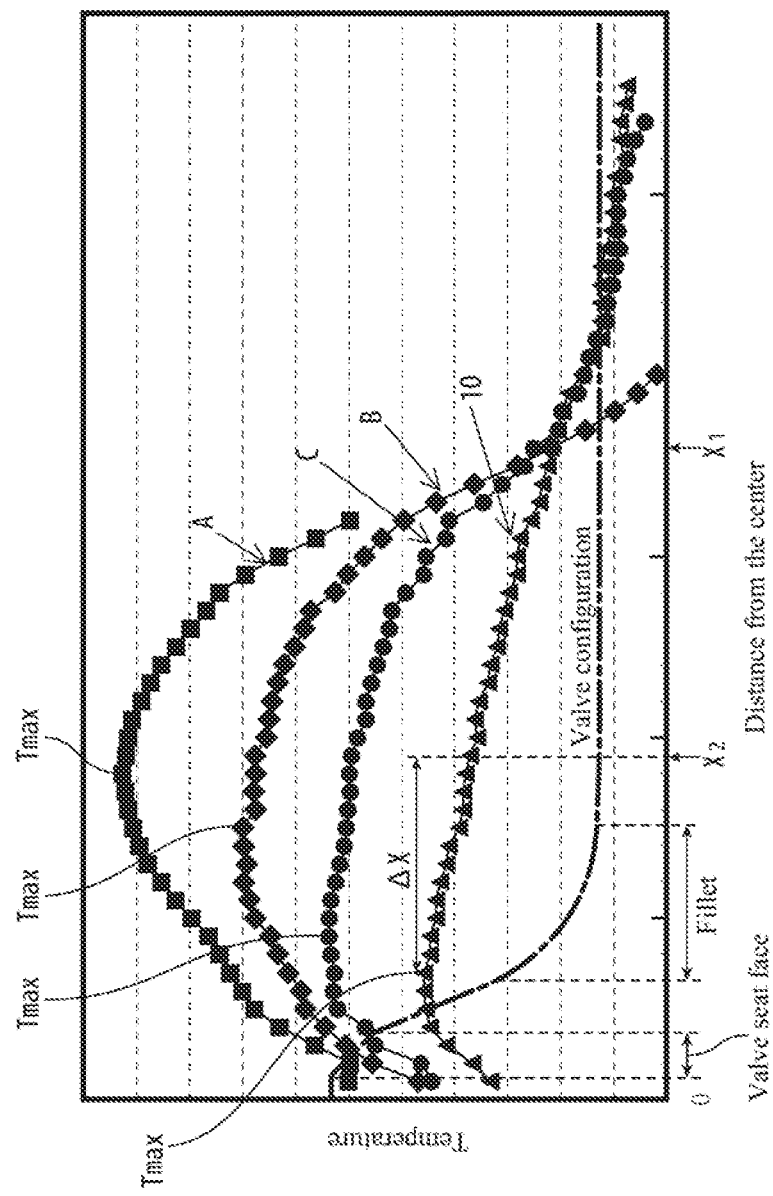
FIG. 4 shows axial distributions of surface temperatures of hollow poppet valves.
Figure 5:
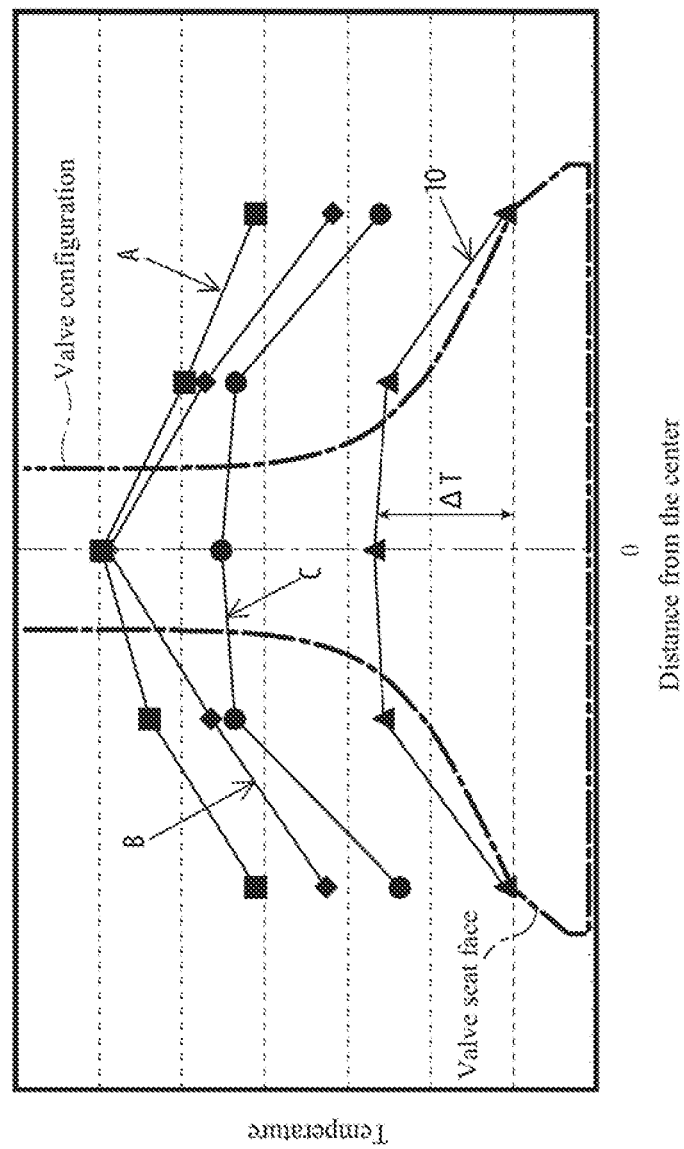
FIG. 5 shows radial distributions of surface temperatures of different hollow poppet valves measured on the bottoms of the valves.

FIG. 4 shows an axial distribution of surface temperature of the hollow poppet valves 10 in comparison with those of a conventional solid valve A, a hollow poppet valve B having a stem charged with a coolant, and a hollow poppet valve C charged with a coolant in the internal valve head cavity and in the internal stem cavity. FIG. 5 shows a radial distribution of surface temperature of the valve head of the hollow poppet valve 10 in comparison with those of the conventional valves A, B, and C. In these figures, dotted lines indicate the outline of the valve.

It is seen in FIG. 4 that general behaviors of axial temperature distributions (referred to as characteristic temperature distributions X) of the valve 10 and the conventional valves A, B, and C are substantially the same in that their temperatures gradually rise from its valve seat face 16 (near the combustion chamber) towards the points of maximum temperature Tmax, and then gradually decrease. However, in the characteristic temperature distribution X of the valve 10, the point of maximum temperature Tmax is closer to the valve head than in the characteristic temperature distribution X of the valve C having the best heat dissipative (or reduction) property among the three conventional valves. Furthermore, the valve 10 exhibits a generally lower surface temperature and a significantly lower surface temperature on the surface of the valve head 14 (including the valve seat face 16) than the conventional valve C. Thus, it manifests a superb heat reduction power (or heat transport property) of the valve 10 as compared with the valve C.

It is particularly noted in the valve 10 that, after the surface temperature reaches the peak temperature Tmax, it decreases almost linearly towards the end of the valve stem, in contrast to the temperature distribution of the valve C that does not decrease linearly after reaching the peak temperature until it exhibits a convex curve.

Thus, it is seen that the surface temperatures of the respective conventional valves A, B, and C change in a substantial quadratic manner, in contrast to that of the valve 10, in which the surface temperature decreases almost linearly from its peak temperature. This feature manifests enhance heat transport occurring from the combustion chamber 4 to the coolant in the internal valve head cavity S1 and further to the remote end of the stem of the valve across the internal stem cavity S2 due to active mixing of the upper, middle, and lower layers of the coolant 19 in the internal cavity S.

It has been confirmed in the simulations and in actual measurements that a largest impact stress is applied to the point X2 of the curved fillet 13 (FIG. 4) near the end of the stem when the hollow poppet valve 10 is seated on the valve seat insert 8. On this account, the valve 10 has the lowest maximum temperature and has the largest distance $\Delta X$ between the point of maximum temperature and the point X2 subjected to the maximum impact stress, in comparison with the valves A, B, C. This feature can effectively suppress thermal deterioration of the valve strength.

It is seen from FIG. 5 that the valve C has the best heat radiation performance among the conventional valves A, B, and C, and that the valve 10 has a still lower surface temperature than the valve C, which in turn shows that the valve 10 has a superb heat reduction effect (or heat transport property).

It has been verified in the above-mentioned simulations and actual experiments that a maximum stress is imposed on the central area of the bottom end of the valve head when the valve is seated on the valve seat insert 8 and exposed to a combustion pressure. In the valve 10, since the temperature difference $\Delta T$ between the central area of the bottom face of the valve head and the periphery of the valve head is small as compared with those of the valves A, B, and C, the hollow poppet valve 10 can suppress regression of fatigue strength more effectively than the valves A, B, and C.

Next, referring to FIG. 6, there is shown a process of manufacturing a hollow poppet valve 10 in accordance with the invention.

Firstly, a shell 11 is formed by hot forging such that it comprises a valve head 14a having a circular truncated-corn shape recess 14b and a stem 12 integral with the shell 11 as shown in FIG. 6(a). The circular truncated-cone shape recess has a flat bottom 14b1 perpendicular to the stem 12 (and to the axis L of the shell 11).

This hot forging may be an extrusion forging in which a heat resisting alloy block shell 11 is repetitively extruded from different metallic dies, or an upset forging in which a heat resisting metallic alloy stick is first upset by an upsetter to form at one end thereof a semi-spherical section, which is then forged with a forging die to form a valve head 14a of the shell 11. In this hot forging, a curved fillet 13 is formed between the valve head 14a and the stem 12, and so is a tapered valve seat face 16 on the periphery of the valve head 14a.

Next, the shell 11 is subjected to heat treatments (such as an aging treatment and a solution heat treatment) to enhance thermal and mechanical strengths of the valve head 14a and of the stem 12, as needed. The shell 11 is then set with its recess 14b oriented upward as shown in FIG. 6(b) and a bore 14e is drilled in the stem 12 across the bottom surface 14b1 of the recess 14b to form an internal stem cavity S2.

In the drilling process, the recess 14b1 of the valve head 14a is communicated with the hole 14e of the stem 12 such that an eave-shape annular step 15 is formed in a region interconnecting the recess 14b (that will serve as the internal stem cavity S2) and the hole 14e (that will serve as an internal valve head cavity S1) of the stem 12.

Next, referring to FIG. 6(c), there is shown a step of charging the hole 14e of the shell 11 with a predetermined amount of solidified coolant 19 (the step hereinafter referred to as coolant charging process).

Finally, in the cavity closing step, a cap 18 is welded (by resistance welding for example) onto the open end 14c of the recess 14b of the shell 11 in the argon atmosphere, thereby forming a closed internal cavity S in the hollow poppet valve 10 as shown in FIG. 6(d). The cap may be welded alternatively by electron beam welding or by laser beam welding.

Since the ceiling 14b1 of the internal valve head cavity S1 (or the eave-shape step 15) of the valve 10 has a flat surface perpendicularly to the axis L of the valve 10 and is communicated with the internal stem cavity S2, the following effects will result.

Firstly, it is much easier to manufacture a metallic die having a flat pressing face adapted to form, in hot forging, a circular truncated-cone shape recess 14b inside the valve head 14a as shown in FIG. 6(a), than other types of dies having, for example, curved or tapered pressing faces.

Secondly, since the bottom face 14b1 of the recess 14b is flat, preliminary machining of the bottom surface of the recess 14b to provide a flat surface is not needed prior to the drilling process.

Thirdly, in the drilling process shown in FIG. 6(b), it is possible to make the hole 14e precisely in the axial direction of the valve by virtue of the bottom face 14b1 of the valve head 14a being flat and perpendicular to the axis of the spindle of the drill.

Figure 7:
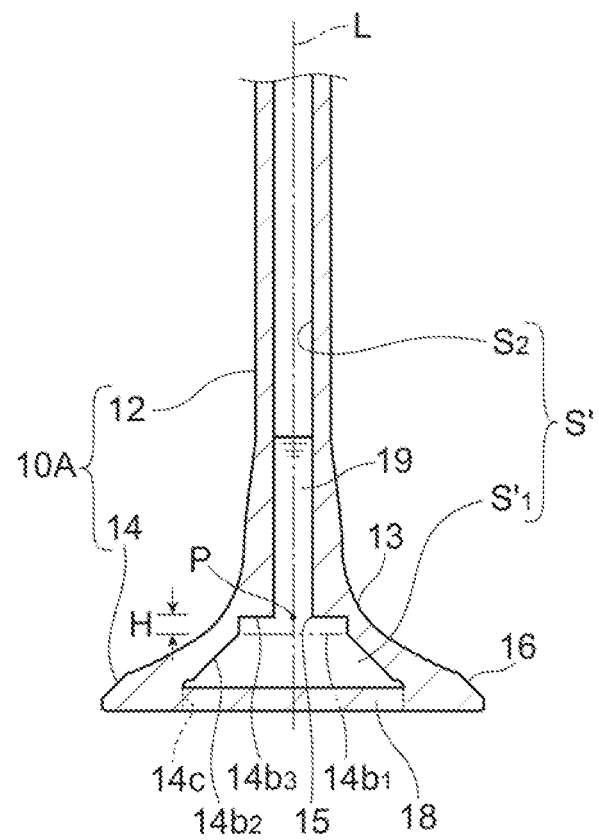
FIG. 7 shows in longitudinal cross section a major portion of a hollow poppet valve in accordance with a second embodiment of the invention.
Figure 8:
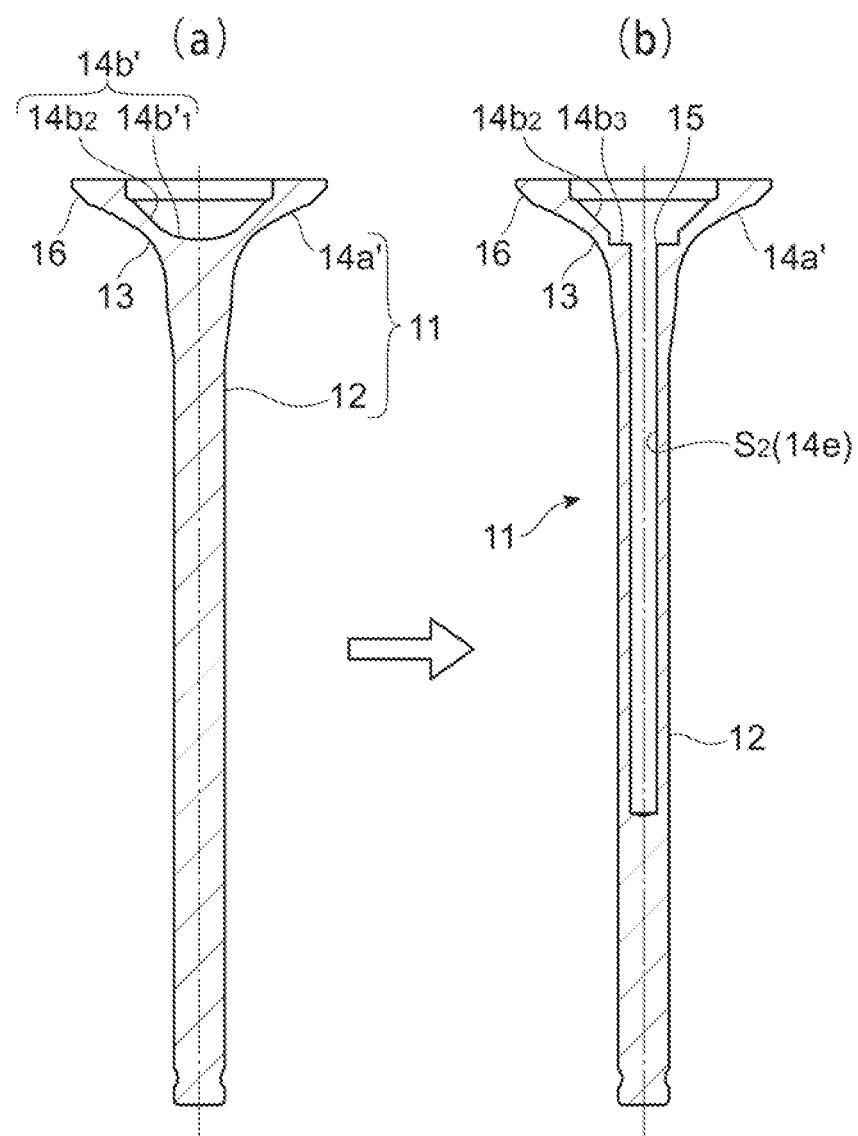
FIG. 8 shows major steps of manufacturing a hollow poppet valve. More particularly.
Figure 9:
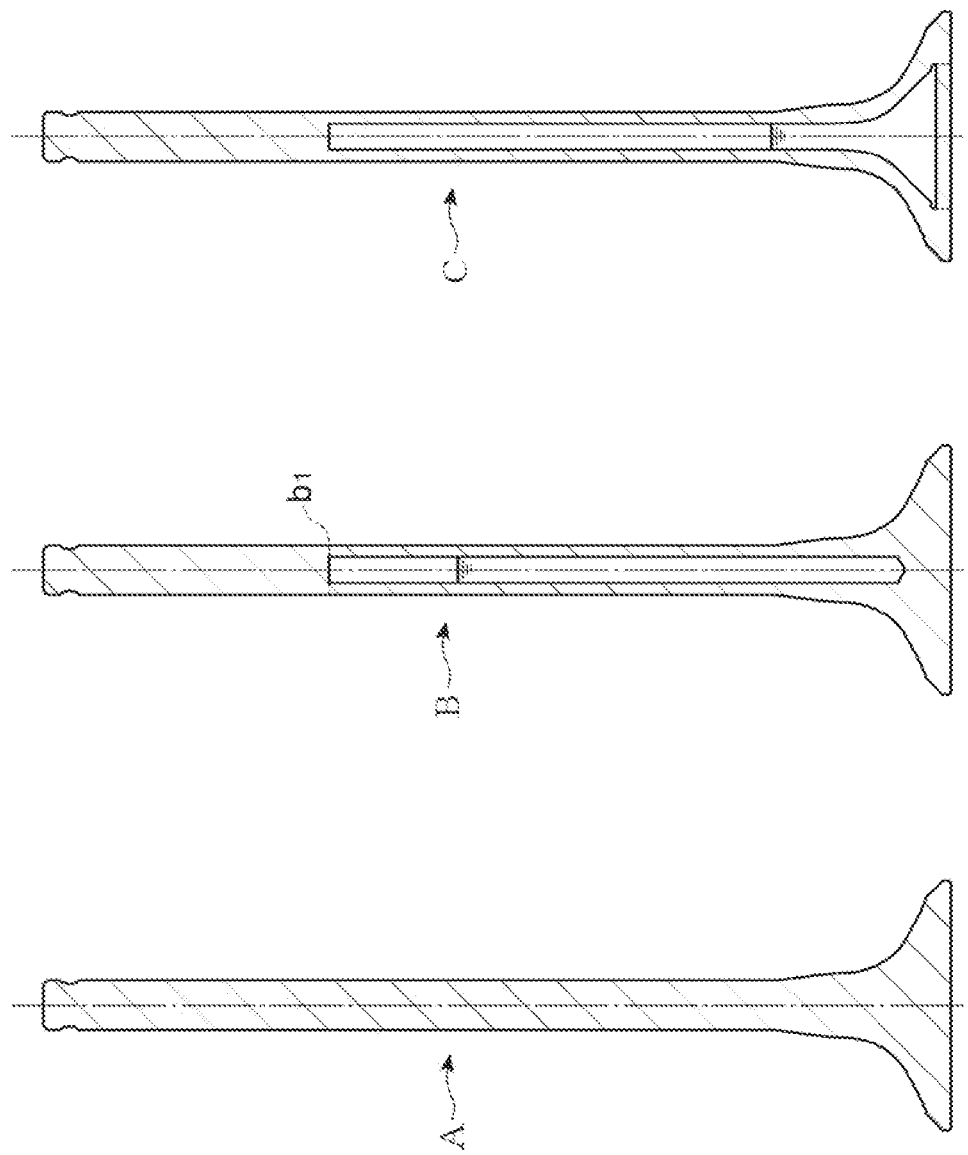
FIG. 9 shows longitudinal cross sections of a conventional solid poppet valve and hollow poppet valves.

FIGS. 7 and 8 show a hollow poppet valve in accordance with a second embodiment of the invention.

It is recalled that the hollow poppet valve 10 of the first embodiment has an internal valve head cavity S1 in the shape of a circular truncated-cone. However, the internal valve head cavity S1' of the poppet valve 10A of the second embodiment has a substantial circular truncated-cone shape.

In contrast to the poppet valve 10, in which the circular ceiling of the valve head cavity S1 (which is perpendicular to the axis L of the valve 10), is the planar flat bottom surface 14b1 of the circular truncated-cone shape recess 14b, the internal valve head cavity S1' of the poppet valve 10A has its ceiling 14b3 (and hence eave-shape annular step 15) offset, perpendicularly to the axis L of the valve 10A, from the position of the ceiling 14b1 of the first embodiment towards the stem 12 by a predetermined distance H, as shown in FIG. 7.

Other features of the second embodiment are the same as those of the first embodiment, so that like or same elements are simply referred to by the same symbols in these embodiments and further descriptions of the valve 10A will be omitted.

The magnitude of the offset distance H of the ceiling 14b3 of the internal valve head cavity S1' is the distance needed to flatten the bottom 14b1' of the recess 14b' of the forged valve head 14a' by machining, and make it perpendicular to the axis L of the valve 10A, as described later.

In other words, the internal valve head cavity S1' formed in the valve head 14 has a generally disk-shape hollow space of height H, appended to the circular truncated-cone shape internal valve head cavity S1. Accordingly, the volume of the internal valve head cavity S' of the valve 10A is larger than that of the internal cavity S of the hollow poppet valve 10 by that volume of the disk-shape hollow space of height H.

In the hollow poppet valve 10A as in the first hollow poppet valve 10, the coolant 19 is circulated in the entire internal cavity S' by convention and turbulence during an opening/closing operation of the valve as shown in FIGS. 3(a) and (b), thereby actively stirring the upper, middle, and lower layers of the coolant 19 and significantly enhancing the heat reduction effect (heat transport property) of the valve.

Although the process of manufacturing the valve 10A is substantially the same as that of the valve 10, the former process requires a further step of machining the circular ceiling 14b3 of the internal valve head cavity S1' after hot forging a shell 11 of a valve head 14a' having a valve head 14a' integral with the stem 12.

More particularly, a shell 11 that has a valve head 14a' having a generally truncated circular-cone-shape recess 14b' and a stem 12 integral therewith is formed in a step as shown in FIG. 8(a). The bottom 14b1' of the generally truncated circular-cone-shape recess 14b' is forged by with a die having a semi-spherically bulging pressing face. As a result, the bottom 14b1' of the recess 14b' is semi-spherically recessed.

The shell 11 is then subjected to a heat treatment to increase its heat resistance and mechanical strength of the valve head 14a' and the stem 12, as needed. In a machining process shown in FIG. 8(b), the bottom 14b1' of the recess 14b' of the valve head 14a' is cut by a predetermined depth H so as to form a circular ceiling 14b3 of the internal valve head cavity S1'. This cutting can be done with an end mill, for example, until the upper end surface 14b3 of the internal valve head cavity S1' becomes a circular flat ceiling 14b3 perpendicularly to the axis L of the valve 10A.

Subsequently, a hole is bored in the stem 12 to form the internal stem cavity S2 as shown in FIG. 8(b). Then the valve 10A is completed by charging its internal cavity with a coolant and closing the internal cavity by welding a cap as shown in FIGS. 6(c) and (d).

As described above, since, in the second embodiment, the internal valve head cavity S1' of the valve 10A is provided with the circular ceiling 14b3 (or eave-shape annular step 15) perpendicular to the axis L of the valve 10A at a position offset from the bottom 14b1 of the internal valve head cavity S1 towards the stem 12 by the predetermined distance H, the valve 10A has the following advantages.

Firstly, by configuring the die for use in the forging step (FIG. 8(a)) to have a semi-spherically bulging end, the die can be made less-wearing. Secondly, precision requirements of the pressing face of the die is eased, so that fabrication of the die is easy, since the circular ceiling 14d3 of the valve head cavity S' is formed by machining after the forging. In addition, the accuracy of the circular ceiling 14d3 of the internal valve head cavity S' can be increased.

Thus, not only a predetermined machining accuracy in the fabrication of the internal valve head cavity S' is guaranteed but also a uniformity in heat reduction effect of the valves 10A is secured.

BRIEF DESCRIPTION OF SYMBOLS 10 and 10A hollow poppet valves
11 shell (of a valve head integral with a stem)
12 stem
14 valve head
14a, 14a' valve head shell
14b and 14b' recesses formed in the front ends of valve heads
14b1 and 14b3 circular ceilings of internal valve head cavities
14b2 conic surface of circular truncated-cone shape valve head cavity formed in the shell
15 eave-shape annular step formed on the ceiling of valve head cavity, round open end of internal stem cavity
L axis of valve
S and S' internal cavities
S1 and S1' disk-shape internal valve head cavities
S2 internal stem cavity
P interconnecting region
18 cap
19 coolant

The invention claimed is:

1. A hollow poppet valve having a stem integral at one end thereof with a valve head, the valve having an internal cavity that extends from within the valve head into the stem and charged with a coolant together with an inert gas, the poppet valve comprising:

the valve head having therein an internal valve head cavity having a truncated-cone shape peripheral wall with a conic surface substantially in parallel with a tapered outer periphery of the valve head;

the stem having therein a linear internal stem cavity connected at an interconnecting opening to an upper end of the internal valve head cavity, said internal stem cavity having a peripheral wall that extends to said interconnecting opening that is substantially parallel to a longitudinal axis of the stem; and said internal valve head cavity having a planar ceiling surface that extends to said interconnecting opening and that is substantially perpendicular to said longitudinal axis of the stem, such that said planar ceiling surface of said internal valve head cavity and said peripheral wall of said internal stem cavity intersect at the interconnecting opening and form a substantially perpendicular annular step;

whereby a vertical convective flow of coolant along the longitudinal axis of the valve is established at least in the internal valve head cavity during a reciprocal motion of the valve.

2. The hollow poppet valve according to claim 1, wherein said planar ceiling surface of said internal valve head cavity is offset from a position of an upper end of the truncated-cone shaped peripheral wall towards the stem by a predetermined distance.

3. The hollow poppet valve according to claim 1, wherein said internal valve head cavity has a substantially planar floor surface extending across substantially an entire bottom of said internal valve head cavity, said substantially planar floor surface being substantially parallel to said planar ceiling surface of said internal valve head cavity.

4. The hollow poppet valve according to claim 1, wherein said planar ceiling surface is substantially circular and has a radius larger than a diameter of said internal stem cavity.

5. The hollow poppet valve according to claim 1, wherein the internal cavity formed by said internal valve head cavity and said internal stem cavity contains the coolant together with the inert gas therein.

6. The hollow poppet valve according to claim 5, wherein said hollow poppet valve is configured such that the vertical convective flow of coolant is established in the internal valve head cavity and a turbulent flow of coolant is established in the internal stem cavity due to reciprocating movement of said poppet valve during use.

7. The hollow poppet valve according to claim 6, wherein said hollow poppet valve is configured such that a point of maximum temperature during use is at or close to said valve head such to create a large distance between the point of maximum temperature and a point of the hollow poppet valve subjected to maximum impact stress during use.

* * * * *